April 29, 1969 R. R. SCHABERG 3,440,889
PICKOFF MEANS FOR GYROSCOPIC DEVICE
Filed Dec. 20, 1966

INVENTOR
RICHARD R. SCHABERG
BY
*Fred B. Schwend*

United States Patent Office 3,440,889
Patented Apr. 29, 1969

3,440,889
PICKOFF MEANS FOR GYROSCOPIC DEVICE
Richard R. Schaberg, Alhambra, Calif., assignor to Clary Corporation, San Gabriel, Calif., a corporation of California
Filed Dec. 20, 1966, Ser. No. 603,302
Int. Cl. G01c 19/28
U.S. Cl. 74—5.6        6 Claims

ABSTRACT OF THE DISCLOSURE

A potentiometer type pickup device for a gyroscope or the like mounted in a guided missile or other maneuverable craft which is capable of indicating movement of the craft about an axis and through more than 180 degrees in either direction from a reference heading.

Background of the invention

Heretofore, pickoff devices of the potentiometer type have generally comprised a resistance element which extended around a gimbal axis of the gyroscope. A sensor or contact member in wiping contact with the resistance element is capable of indicating the extent of movement of the craft up to, but not beyond, 180 degrees on either side of a zero reference point or heading. However, it is at times desirable to indicate or control movement of the craft beyond such 180 degree range.

Although it would be possible to gear the sensor or contact member to the movable portion of the gyroscope through a suitable reduction gearing, permitting indication beyond the 180 degree range on either side of the zero reference point or heading, such gearing introduces a friction factor which, in most cases, would be intolerable due to precession tendencies introduced by such friction.

Summary of the invention

The invention comprises a pickoff device of the potentiometer type incorporated in a gyroscope or similar reference device for indicating or controlling the movement of a guided missile, aircraft, or other maneuverable craft about an axis. The device comprises a pair of impedance elements, such as resistance elements which extend end-to-end around such axis of movement. A contact or sensor member is located in sensing cooperation with the impedance elements to indicate electrically the extend of movement about the axis. The device comprises means for applying an electrical potential of a predetermined value to a first terminal of a first one of the elements and an electrical potential of a lower value to the second terminal of such first element, means normally applying a potential of said predetermined value to a first terminal of the second one of the elements lying adjacent the first terminal of the first element and for applying a potential of a higher value to the second terminal of the second element, and means responsive to movement of the contact member along the first element and toward the second terminal of the latter for applying a potential equal to such lesser potential to the second terminal of the second element and for applying a potential of progressively lower value to said first terminal of said second element.

Description of the preferred embodiment

Figure 1:
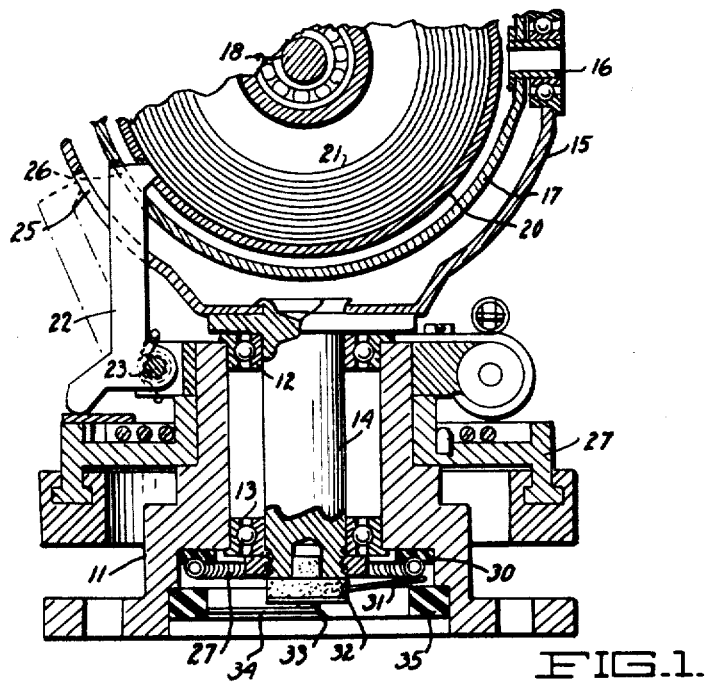
FIG. 1 is a sectional view, with parts broken away, of a gyroscope embodying a preferred form of the present invention.

Although the pickoff device of the present invention may be applied to many different forms of gyroscopes or similar reference devices, FIG. 1 illustrates an exemplary gyroscope embodying the pickoff device. Such gyroscope is disclosed and claimed in the copending application of Andrew Voge, Ser. No. 547,682, filed on Apr. 1, 1966. Therefore, reference may be had to such application for a complete disclosure of the gyroscope. Accordingly, only those portions of the gyroscope which relate to, or form part of, the present invention will be described in detail herein.

The gyroscope comprises a tubular support or base 11 adapted to be mounted on the frame of a guided missile, a rocket, aircraft, or the like. Ball bearings 12 and 13 fitted within the tubular portion of the support rotatably support a spindle 14 of an outer gimbal 15 for rotation about an outer gimbal axis.

The outer gimbal 15 carries a pair of spaced coaxially arranged bearings 16 which support an inner gimbal 17 for movement about an inner gimbal axis extending perpendicular to and intersecting the outer gimbal axis. The inner gimbal rotatably supports the spindle 18 of a rotor 20 for rotation about a spin axis extending perpendicular to and intersecting the inner and outer gimbal axes.

A wound torsion or clock spring 21 is connected to the rotor 20 tending to rotate the same. However, the rotor is normally prevented from rotating by a latch lever 22 pivotally supported at 23 by the support 11. The latch extends through slots 25 and 26 in the outer and inner gimbals 15 and 17, respectively, to also hold the same in caged condition. Upon rotation of a blocking ring 27 under control of suitable control means (not shown), the latch is caused to rock counterclockwise about its pivot 23, thus first releasing the rotor so that it may be brought up to an operating speed by the spring 21 and thereafter receding from the slots 25 and 26, thereby uncaging the gyro and leaving the same free to perform as a two-gimbal free gyroscope.

According to the present invention, pickoff means are provided to indicate the attitude of the support 11 about the outer gimbal axis by an amount up to 270 degrees on either side of a zero reference point or heading.

For this purpose, a pair of semi-circular resistance elements 27 and 28 are supported on a circular holder 30 which, in turn, is secured to the lower portion of the support 11 in a position extending concentrically of the shaft 14. The resistance elements 27 and 28 may be of resistance wire, each wound in a helical coil form and having uniform resistance characteristics throughout its length.

A sensing or contact brush member 31 of resilient metal is supported in wiping contact with the resistance elements by a button 32 of insulating material which is attached to the lower end of the spindle 14. The contact brush member is electrically connected to a central contact 33 on the button, which contact is in wiping engagement with a resilient brush arm 34 carried by a circular ring 35 of insulating material suitably secured to the lower end of the support 11.

Figure 2:
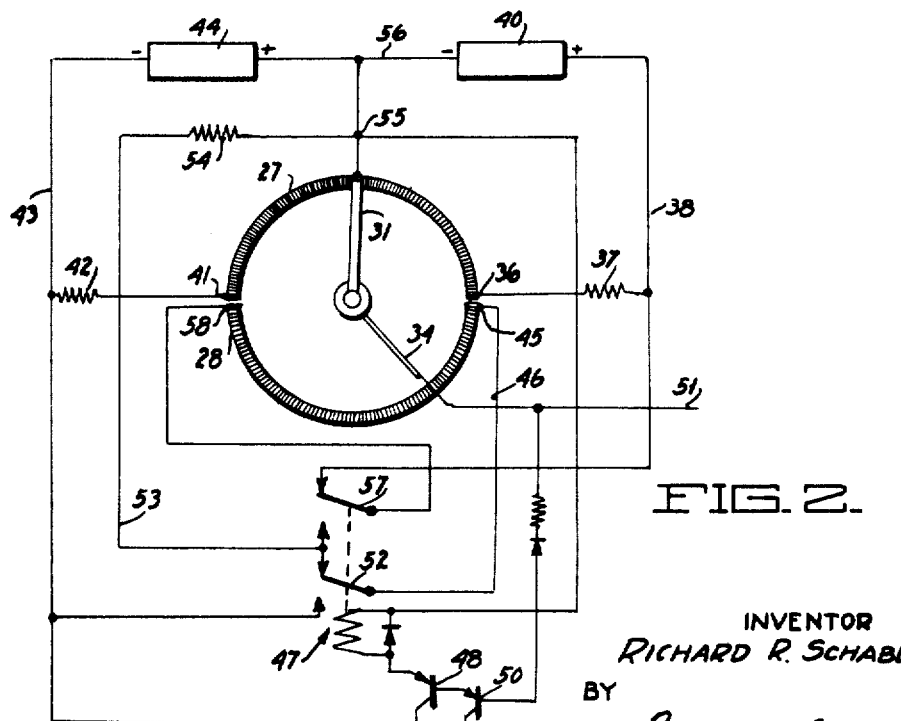
FIG. 2 is a schematic view illustrating the pickoff circuit.

Referring to FIG. 2, the resistance elements 27 and 28 are located with their ends closely adjacent each other but out of electrical contact and each has a resistance value of 1667 ohms. The righthand terminal 36 of element 27 is connected through a resistor 37 of 1667 ohms and line 38 to the positive side of an 18 volt power supply 40 while the lefthand terminal 41 is connected through a second resistor 42, also of 1667 ohms, and line 43 to the negative side of the second 18 volt power supply 44.

The righthand terminal 45 of the resistance element 28 is connected through line 46 to one switch arm 52 of a double pole, double throw relay 47, the winding of which is connected through a normally non-conducting PNP transistor 48 to the line 43. The base of transistor 48 is connected to the emitter of a second normally non-conducting PNP transistor 50, the base of which is connected to an output line 51 of the brush arm 34. The latter line 51 is connected to a suitable instrument (not shown) which indicates by virtue of a positive or negative potential applied thereto by the contact brush member 31 the attitude of the missile or craft relative to a zero reference heading. That is, when the member 31 is in its neutral position shown in FIG. 2, a zero potential will exist on line 51, indicating that the craft is on a zero heading and in such condition the transistors 48 and 50 will remain non-conducting and switch arm 52 will connect line 46 to a line 53 which is connected through a resistor 54 of 834 ohms to a zero voltage point 55, the latter being connected to line 56 connecting the negative side of power supply 40 to the positive side of power supply 44. In this condition, the second switch arm 57 of the relay connects the lefthand terminal 58 of resistance element 28 to the positive side of the power supply 40. Accordingly, a positive potential of 18 volts will be applied to the terminal 58 and a positive potential of 6 volts will be applied to terminal 45. Thus, the resistance elements 27 and 28, present, in effect, voltage levels progressing clockwise in a straight line relation from zero voltage at zero degree heading to plus 18 volts at 270 degrees and as the support 11 turns counterclockwise about its outer gimbal axis, the heading will be represented as a positive voltage applied over line 51, the amplitude of the voltage representing the particular heading.

As the support 11 turns clockwise from its zero degree heading shown in FIG. 2, relative to the member 31, a negative voltage will be applied to the output lines 51 causing conduction of the transistors 48 and 50 to energize the relay 47 to connect relay switch arms 52 and 57 to the lines 43 and 53, respectively. Therefore, a negative potential of 6 volts will be applied to terminal 58 and a negative potential of 18 volts will be applied to the terminal 45 of the element 28. Accordingly, the resistance elements will now present voltage levels progressing counterclockwise in a straight line relation from zero voltage at zero degree heading to minus 18 volts at 270 degrees heading as measured in a counter clockwise direction.

Obviously, the elements 27 and 28 may be modified to extend through angles other than 180 degrees. For example, the element 27 could be modified to extend through an angle of 5 degrees on each side of the zero degree reference heading and the element 28 would extend through approximately 350 degrees. Accordingly, with appropriate potentials applied thereto, the pickoff device would be capable of indicating rotation of the support through 350 degrees in either direction from the zero degree heading.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

I claim:
1. In a gyroscope having a rotor,
    gimbal means supporting said rotor for rotation about a spin axis,
    a support, and
    means on said support rotatably supporting said gimbal means for rotation about a gimbal axis;
    pickoff means for indicating the attitude of said support relative to said gimbal means comprising a pair of resistance elements extending end-to-end about said gimbal axis,
    a contact brush member in wiping engagement with said resistance elements for indicating electrically the angular attitude of said support relative to said gimbal means,
    means for causing relative movement between said resistance elements and said contact brush member in concert with movement of said support about said gimbal axis,
    means for applying an electrical potential of a predetermined value to a first terminal end of a first one of said resistance elements and an electrical potential of a lower value to the second terminal end of said first resistance element,
    a first circuit means for applying a potential of said predetermined value to a first terminal end of the second one of said resistance elements lying adjacent said first terminal end of said first resistance element and for applying a potential of a higher value to the second terminal end of said second resistance element,
    a second circuit means for applying a potential equal to said lower potential to said second terminal end of said second resistance element and for applying a potential of lower value to said first terminal end of said second resistance element, and
    means responsive to movement of said contact brush member toward said first terminal end of said first resistance element for enabling said first circuit means,
    said last mentioned means being responsive to movement of said contact brush member toward said second terminal end of said first resistance element for enabling said second circuit means.
2. Pickoff means according to claim 1 wherein said first mentioned potential is of a positive polarity and said second mentioned potential is of a negative polarity.
3. Pickoff means according to claim 1 wherein said last mentioned means comprises relay means controlled by potential applied to said contact brush member for applying a potential of higher value to said second terminal of said second resistance element or potential of lower value to said first terminal end of said second resistance element.
4. Pickoff means according to claim 2 wherein said first mentioned potential is of a positive polarity and said second mentioned potential is of a negative polarity.
5. Pickoff means according to claim 1 wherein said electrical potential applying means comprises an electric power source having a positive, a neutral and a negative terminal,
    means comprising an impedance for connecting said positive terminal to said first terminal and of said first element;
    means comprising a second impedance for connecting said negative terminal to said second terminal end of said first element; and
    wherein said last two mentioned means comprise a switching device responsive to relative movement of said contact brush member along said first element for connecting said positive or said negative terminal to one of said terminal ends of said second element and for connecting the other of said terminal ends of said second element to said neutral terminal.
6. Pickoff means according to claim 5 comprising means responsive to positive or negative potential applied to said contact brush member for actuating said last mentioned means.

No references cited

ROBERT A. O'LEARY, *Primary Examiner.*

WILLIAM E. WAYNER, *Assistant Examiner.*

U.S. Cl. X.R.

33—204, 226; 338—150